United States Patent
Ochiai et al.

(10) Patent No.: US 10,503,724 B2
(45) Date of Patent: Dec. 10, 2019

(54) SYSTEM AND METHOD FOR CONTACT INFORMATION ACCESS

(71) Applicant: Toyota Motor Engineering & Manufacturing North America, Inc., Erlanger, KY (US)

(72) Inventors: Yuichi Ochiai, Cupertino, CA (US); Katsumi Nagata, Foster City, CA (US); Akira Sasaki, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 466 days.

(21) Appl. No.: 15/060,420

(22) Filed: Mar. 3, 2016

(65) Prior Publication Data
US 2017/0255667 A1 Sep. 7, 2017

(51) Int. Cl.
*G06F 16/00* (2019.01)
*G06F 16/23* (2019.01)
*G06F 16/22* (2019.01)

(52) U.S. Cl.
CPC ...... *G06F 16/2365* (2019.01); *G06F 16/2291* (2019.01); *G06F 16/2358* (2019.01)

(58) Field of Classification Search
None
See application file for complete search history.

(56) References Cited

U.S. PATENT DOCUMENTS

| 6,510,383 | B1* | 1/2003 | Jones | G01C 21/343 340/993 |
| 6,609,006 | B1 | 8/2003 | Mori | |
| 7,870,187 | B2 | 1/2011 | LaSalle et al. | |
| 7,917,576 | B1 | 3/2011 | Kling | |
| 8,155,281 | B2 | 4/2012 | Griggs et al. | |
| 8,280,965 | B2 | 10/2012 | DellaFera et al. | |
| 8,417,269 | B1 | 4/2013 | Lin | |
| 9,778,653 | B1* | 10/2017 | McClintock | G05D 1/00 |
| 2001/0037174 | A1* | 11/2001 | Dickerson | G07B 15/00 701/400 |
| 2003/0135574 | A1 | 7/2003 | Burg | |
| 2004/0128062 | A1* | 7/2004 | Ogino | G01C 21/26 701/400 |

(Continued)

FOREIGN PATENT DOCUMENTS

GB 2381988 5/2003
WO WO2010/012988 2/2010

*Primary Examiner* — Bai D Vu
(74) *Attorney, Agent, or Firm* — Snell & Wilmer LLP

(57) ABSTRACT

Methods, systems, and apparatus for information access and response for an occupant in a vehicle. The system includes a communication device connected to a network and coupled to the vehicle. The vehicle includes an internal database for storing multiple contacts in a contact list. The internal database is coupled to an electronic control unit. The electronic control unit is coupled to the communication device and configured to obtain a new contact attribute from a communication, and determine that the new contact attribute belongs to a new contact. The electronic control unit is configured to obtain one or more other contact attributes for the new contact, and generate the new contact. The electronic control unit is configured to store the new contact in the contact list.

18 Claims, 5 Drawing Sheets

(56) References Cited

U.S. PATENT DOCUMENTS

| | | | |
|---|---|---|---|
| 2004/0225712 A1* | 11/2004 | Tajima | G01C 21/3679 |
| | | | 709/201 |
| 2005/0232402 A1 | 10/2005 | Greve | |
| 2006/0149395 A1 | 7/2006 | Archacki, Jr. et al. | |
| 2007/0197231 A1* | 8/2007 | Lin | G08G 1/123 |
| | | | 455/456.1 |
| 2007/0283039 A1 | 12/2007 | Kim et al. | |
| 2008/0192757 A1 | 8/2008 | Hirchson | |
| 2011/0055234 A1* | 3/2011 | Miettinen | G06F 17/30985 |
| | | | 707/755 |
| 2012/0064865 A1* | 3/2012 | Choi | H04W 4/046 |
| | | | 455/414.1 |
| 2012/0166554 A1 | 6/2012 | Preece | |
| 2013/0158778 A1* | 6/2013 | Tengler | G08G 1/096716 |
| | | | 701/31.5 |
| 2013/0226371 A1* | 8/2013 | Rovik | H04L 63/102 |
| | | | 701/2 |
| 2015/0066606 A1* | 3/2015 | Smirin | G06Q 30/0633 |
| | | | 705/13 |
| 2015/0160019 A1* | 6/2015 | Biswal | G01C 21/26 |
| | | | 701/1 |
| 2016/0364678 A1* | 12/2016 | Cao | G06Q 10/083 |
| 2017/0079056 A1* | 3/2017 | Sakwa | H04L 67/322 |
| 2017/0110009 A1* | 4/2017 | Knoepfle | G08G 1/0112 |
| 2017/0147951 A1* | 5/2017 | Meyer | G06Q 50/14 |
| 2018/0032997 A1* | 2/2018 | Gordon | G06Q 20/3224 |

\* cited by examiner

SYSTEM AND METHOD FOR CONTACT INFORMATION ACCESS

BACKGROUND

1. Field

This specification relates to accessing and responding to communications by an occupant of a vehicle.

2. Description of the Related Art

Personal devices are used to store, access, manage and communicate with contacts. Drivers connect these personal devices to the vehicle to make phone calls and communicate with their contacts. A significant amount of communication is done over email and Short Message Service (SMS) messaging. Responding to emails, SMS messages, and other urgent messages distract a driver. Moreover, people are constantly active and busy so received communications are often urgent and require an immediate response.

Accordingly, there is a need of a system and method for automatically responding to urgent communications and providing status updates to others while the driver is in a vehicle or is operating a vehicle.

SUMMARY

In general, one aspect of the subject matter described in this specification is embodied in a system for an information access and response system for a vehicle that includes a communication device connected to a network and coupled to the vehicle. The vehicle includes an internal database for storing multiple contacts in a contact list. The internal database is coupled to an electronic control unit. The electronic control unit is configured to obtain a new contact attribute from a communication received by the communication device. The electronic control unit is configured to determine that the new contact attribute belongs to a new contact of the contact list and obtain one or more other contact attributes for the new contact. The electronic control unit is configured to generate the new contact using the new contact attribute and the one or more other contact attributes. The electronic control unit is configured to store the new contact in the contact list.

These and other embodiments may optionally include one or more of the following features. The electronic control unit may be configured to compare the new contact attribute to multiple contact attributes of each contact in the contact list. The electronic control unit may determine that the new contact attribute does not match any of the contact attributes. The electronic control unit may be configured to extract the new contact attribute from an email to obtain the new contact attribute. The new contact attribute may be the sender's email address. The electronic control unit may be configured to receive user input from a user interface to obtain the new contact attribute. The user input may be a phone number, a first name, a last name, a nickname or an email address. The user interface may be an input/output device.

The system may include one or more external databases connected to the vehicle through the network. The electronic control unit may be configured to send to the communication device or the one or more external databases, a request for one or more other contact attributes. The request may include the new contact attribute of the new contact. The electronic control unit may be configured to receive from the communication device or the one or more external databases, a response that includes the one or more other contact attributes of the new contact. The electronic control unit may display a request that includes one or more user input fields corresponding to the one or more other contact attributes on the user interface and receives a response that includes user input to obtain the one or more other contact attributes. The electronic control unit may access the communication device or one or more external databases and extract from a calendar, an email or an invitation on the communication device or in the external database, the new contact attribute that is a first name, a last name, a phone number or an email address. The electronic control unit may associate the new contact attribute and the one or more other contact attributes to an identifier to generate the new contact.

In another aspect, the subject matter is embodied in a method for automatically responding to a received communication. The method includes obtaining a received communication from a personal device, and determining from the received communication an expected arrival time and contact information. The method includes obtaining vehicle information and navigational map information. The method includes determining that the received communication requires a response based on at least one of the expected arrival time, contact information, vehicle information and navigational map information, and determining a particular contact attribute for receipt of the response based on the contact information and a contact list. The method includes generating the response based on the received communication, user input or user configurations, and sending the response to the particular contact attribute.

In another aspect, the subject matter is embodied in a system for an information access and response system for an autonomous vehicle that includes a personal device connected to a network and coupled to the autonomous vehicle. The autonomous vehicle includes one or more sensors coupled to a navigation unit that provides input to operate the autonomous vehicle. The autonomous vehicle includes an internal database for storing multiple contacts in a contact list and is coupled to an electronic control unit. The electronic control unit is coupled to the personal device and is configured to obtain a received communication from the personal device. The electronic control unit is configured to determine from the received communication an expected arrival time and contact information. The electronic control unit is configured to determine that the received communication requires a response based on at least one of the expected arrival time, contact information, vehicle information and navigational map information. The electronic control unit is configured to determine a particular contact attribute for receipt of the response based on the contact information and a contact list. The electronic control unit is configured to generate the response based on the received communication, user input or user configurations, and send the response to the particular contact attribute.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for creating a contact list and automatically responding to communications. Particular embodiments of the subject matter described in this specification may be implemented to realize one or more of the following advantages. By automatically detecting and responding to various forms of communication, a driver is able to automatically provide status updates to other individuals as to his or her whereabouts and estimated arrival time. By sending the response of various communications via different communication methods, the driver ensures that the recipient receives the response in a timely manner. Additionally, by automatically generating the response, the driver may maintain his focus on the road.

Other benefits and advantages include the ability to anticipate that a driver will be late to a commitment, e.g., a meeting, and automatically inform the one or more contacts of his or her status. For example, if John's calendar says he has a meeting at 1 p.m. with Tim in downtown Los Angeles, and John's estimated arrival time is 1:30 p.m., the system may automatically inform Tim via a text message, an iMessage or an SMS message that indicates that John will be 30 minutes late even though the calendar entry only had Tim's email address, for example.

Figure 1:
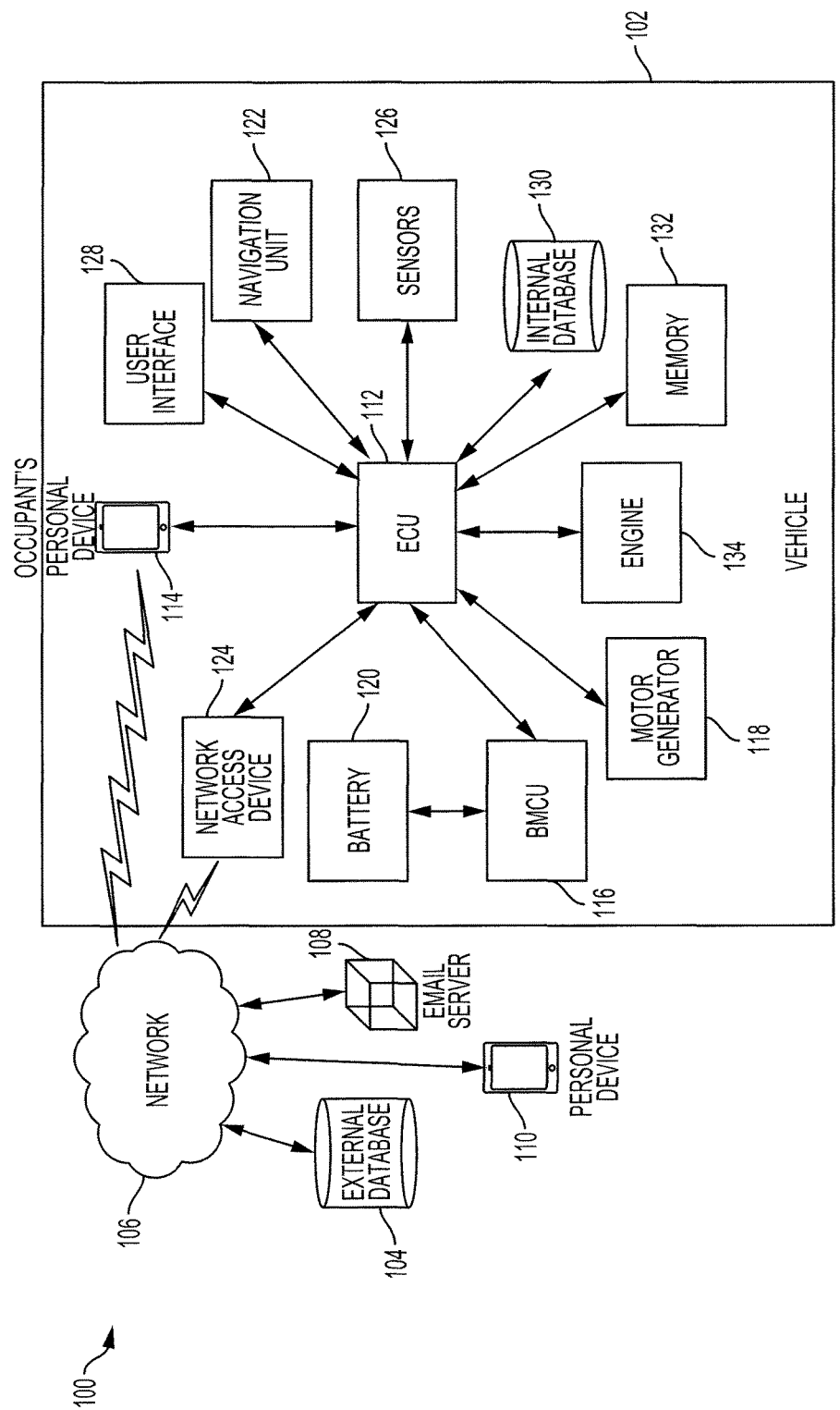
FIG. 1 is a block diagram of an example information access and response system for a vehicle according to an aspect of the invention.

FIG. 1 is a block diagram of an example information access and response system for a vehicle 102. The information access and response system 100 may include one or more computers or electronic control units (ECUs), appropriately programmed, to perform information access and response.

The information access and response system 100 may include a vehicle 102 that is coupled to a network 106 and one or more external databases 104. A vehicle, e.g., vehicle 102, is a conveyance capable of transporting a person or persons or any material or any permanently or temporarily affixed apparatus. A vehicle may be a self-propelled wheeled conveyance, such as a car, a sports utility vehicle, a truck, a bus, a van or other engine, motor and/or battery driven vehicle. For example, the vehicle 102 may be a gasoline or diesel engine powered vehicle, an electric vehicle, a hybrid vehicle, a plug-in hybrid vehicle or any other type of vehicle that includes an engine 134, a battery 120 and/or a motor/generator 118. Other examples of vehicles include bicycles, trains, planes, or boats, and any other form of conveyance that is capable of transportation. A vehicle, e.g., vehicle 102, may be a semi-autonomous vehicle or an autonomous vehicle. That is, the vehicle 102 may be self-maneuvering and navigate without human input. An autonomous vehicle may use one or more sensors 126, e.g., a proximity sensor, and a navigation unit 122 to drive autonomously.

The vehicle 102 may be coupled to a network 106. The network 106, such as a local area network (LAN), a wide area network (WAN), a cellular network, the Internet, a dedicated short-range communications (DSRC) or combinations thereof, connects the vehicle 102 to the one or more external databases 104. The external databases 104 may include many databases from different service providers. A service provider may provide information to the vehicle 102. The external databases 104 may include an email server, e.g., email server 108, or another personal device, e.g., personal device 110. In some implementations, the email server 108 and/or the personal device 110 are separate from the external databases 104.

Information provided by the service providers may include navigational map information, traffic condition information, vehicle information or other information. The information may be stored in the one or more databases, e.g., external databases 104. A navigation unit 122 or an ECU 112 coupled to the one or more external databases 104 through the network 106 may obtain navigational map information, traffic condition information, vehicle information or route calculations. In some implementations, one or more sensors 126, e.g., a vehicle speed sensor or an internal clock, coupled to the ECU 112 may detect vehicle information and/or traffic condition information.

Navigational map information may include information on terrain features, political features, and road features. Terrain features include locations of physical geographic features such as hills, mountains, rivers, and forests. Terrain features may also include elevation or topographical information. Political features include locations of cities, states, roadways, and the associated laws and regulations that regulate the political features, e.g., traffic signs. Road features include speedbumps, on-ramps, highways, bridges, dirt roads, and other types of roadways. The location information of the features may include map coordinates.

Vehicle information may include a current speed of the vehicle 102, a current date/time and/or a current location of the vehicle 102. Traffic condition information includes one or more locations of traffic congestion based on a density of vehicles. Other information may include weather information, construction information, or any other information that may delay the vehicle 102 from reaching the destination location.

A database is any collection of information organized for search and retrieval, such as by a computer, and the database may be organized in tables, schemas, queries, reports, or any other data structures. A database may use any number of database management systems. One or more external databases 104 may include a third-party server or website that stores or provides information. The information may include real-time, periodically updated, or user-inputted information. A server may be a computer in a network that is used to provide services, such as accessing files or sharing peripherals, to other computers in the network. A website may be a collection of one or more resources associated with a domain name.

The vehicle 102 may include an engine 134, a motor/generator 118, an ECU 112, a battery management and control unit (BMCU) 116, an internal database 130, and a battery 120. The vehicle 102 may also include a navigation unit 122, a network access device 124, one or more sensors 126, and one or more user interfaces 128. The vehicle 102 may connect to an occupant's personal device 114, e.g., a smart phone, a cellphone, a personal computer, a tablet, or other communication device of an occupant. The occupant's personal device 114 may connect to a recipient's personal device 110 or an email server 108 across the network 106.

The motor/generator 118 may convert electrical energy into mechanical power, such as torque, and may convert mechanical power into electrical energy. The motor/generator 118 may be coupled to the battery 120. The motor/ generator 118 may convert the energy from the battery 120 into mechanical power, and may provide energy back to the battery 120, for example, via regenerative braking. In some implementations, the vehicle 102 may include one or more additional power generation devices such as the engine 134 or a fuel cell stack (not shown). The engine 134 combusts fuel to provide power instead of and/or in addition to the power supplied by the motor/generator 118.

The battery 120 may be coupled to the motor/generator 118 and may provide electrical energy to and receive electrical energy from the motor/generator 118. The battery 120 may include one or more rechargeable batteries.

The BMCU 116 may be coupled to the battery 120 and control and manage the charging and discharging of the battery 120. The BMCU 116, for example, may measure, using battery sensors (not shown), parameters used to determine the state of charge (SOC) of the battery 120.

The ECU 112 may be electrically coupled to some or all of the components of the vehicle 102. The ECU 112 may include one or more processors or controllers specifically designed for automotive systems and vehicles. The functions of the ECU 112 may be implemented in a single ECU or in multiple ECUs. The ECU 112 may receive data from one or more components and control the operations of the one or more components based on the received or determined data. For example, the ECU 112 may receive data from a navigation unit 122, one or more sensors 126, and a network access device 124 and integrate the data received from each of the devices to output a display on a user interface 128. The ECU 112 may control the operations of the BMCU 116 to charge or discharge the battery 120.

The ECU 112 may be coupled to the one or more user interfaces 128, e.g., a personal device of an occupant or a vehicle display that performs user input and output. The user interface 128 displays, for example, contact information to occupants of the vehicle and/or obtains user inputs including configuration settings and contact attributes. The user interface 128 may include any device capable of receiving user inputs, such as a button, a dial, a microphone, a touchpad, a touch screen, and/or any device capable of input/output, e.g., a display, a microphone, a speaker, or a refreshable braille display. The user interface 128 allows a driver or a passenger of the vehicle 102 to communicate with the ECU 112. For example, the driver may be able to provide data to the ECU 112 and/or receive feedback from the ECU 112 via the user interface 128.

The memory 132 may be coupled to the ECU 112. The memory 132 may store instructions to execute on the ECU 112 and may include one or more of a RAM or other volatile or non-volatile memory. The memory 132 may be a non-transitory memory or a data storage device, such as a hard disk drive, a solid-state disk drive, a hybrid disk drive, or other appropriate data storage, and may further store machine-readable instructions, which may be loaded and executed by the ECU 112. The memory 132 may store an internal database 130. In some implementations, the internal database 130 is coupled to the ECU 112. The internal database 130 may manage, control and provide access to a contact list.

The navigation unit 122 may include a Global Positioning System (GPS) unit (not shown) for detecting location data and date/time information. The navigation unit 122 may provide navigation instructions based on the detected location data and may include a memory (not shown) for storing route data. The navigation unit 122 may receive data from other sensors capable of detecting data corresponding to location information. For example, the other sensors may include a gyroscope or an accelerometer.

The network access device 124 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 124 may transmit data to and receive data from devices and systems not directly connected to the vehicle 102. For example, the ECU 112 may communicate with the external databases 104 through the network access device 124.

Figure 2:
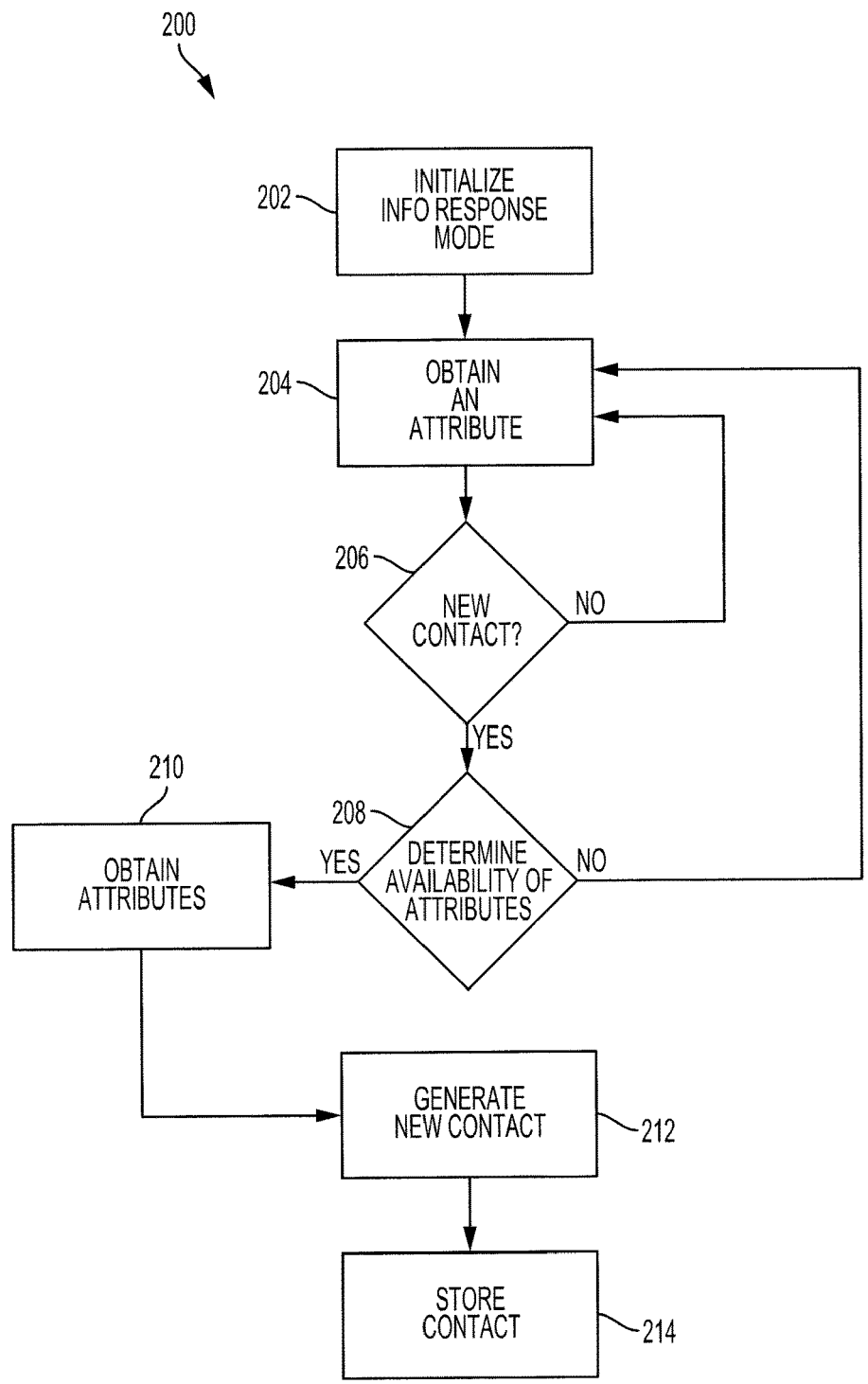
FIG. 2 is a flow diagram of an example process for generating a new contact for a contact list according to an aspect of the invention.

FIG. 2 is a flow diagram of an example process 200 for generating a new contact for a contact list. One or more computers or one or more data processing apparatuses, for example, the ECU 112 or the navigation unit 122 of the information access and response system 100 of FIG. 1, appropriately programmed, may implement the process 200.

The system may initialize an information access and response mode based on an indication that the vehicle is operational or user input (202). For example, when the vehicle 102 is powered on, when the vehicle 102 begins initial movement after being powered on, when the user interface 128 of the vehicle is activated, or when the navigation unit 122 is activated, the system may initialize the information access and response mode. The system may use one or more sensors 126 or the navigation unit 122 to detect vehicle operation. For example, an ignition sensor may indicate to the ECU 112 that the vehicle 102 is operational to turn on the information access and response mode. In some implementations, the system initializes the information access and response mode based on user input. A user interface 128 may receive user input, such as a selection of a touch pad, a touch screen, a switch, a button or user interface element and/or voice commands, to turn on the information access and response mode.

The system obtains a new contact attribute (204). The system may obtain the new contact attribute from a received communication sent to the personal device 114. A contact attribute is an identifier associated with a contact. The identifier may be a number, e.g., a phone number, a personal id, e.g., an instant messaging service user identifier, a first name, a nickname, or a last name, or an address, e.g., an email address, that is associated with the contact. The contact list may have one or more contacts, and each contact may have multiple contact attributes. The contact attributes may be of a particular type, e.g., part of a name, a phone number, an email address, a physical address or general information. Each type may have sub-types, such as a mobile, home, or office phone number or email address.

The personal device 114 connected to the vehicle 102 may receive a communication, such as an email, a phone call, a calendar invitation, or the like. To obtain the new contact attribute, the system extracts from the received communication the new contact attribute. For example, the system may retrieve a sender's electronic mail (email) address from an email by parsing the text and metadata associated with the email. In another example, the system may parse or obtain data associated with an incoming call to identify a caller's phone number. For a calendar invitation, the system may extract the participants of the meeting or appointment from the calendar invitation and/or metadata associated with the calendar invitation. For example, John has a scheduled appointment with Tim and Jane at ABC Company. The system may identify John, Tim and Jane as the participants of the appointment. In another example, the system extracts a user identifier from metadata associated with an instant message or short message service (SMS) message.

In some implementations, the system parses a data header or a label to identify the new contact attribute based on a pre-determined or user configurable pattern, e.g., a phone number format, an email address format, a first name and last name pattern, or an instant message handle or identifier.

The system determines whether the new contact attribute belongs to a new contact based on a contact list (206). The contact list may be stored in the internal database 130. The system may compare the new contact attribute to each contact attribute of the contacts stored in the contact list. If the new contact attribute matches a contact attribute of one of the contacts stored in the contact list, the system determines that the new contact attribute does not belong to a new contact. If the new contact attribute does not match a contact attribute of one of the contacts stored in the contact list, the system determines that the new contact attribute does belong to a new contact, and the system proceeds with obtaining one or more other attributes of the new contact. The system may search all contact attributes of a contact when determining whether the new contact attribute matches a contact attribute of the contact. In some implementations, the system searches the contact attributes that are of the same type as the new contact attribute when determining whether the new contact attribute matches a contact attribute of the contact.

The system determines whether one or more other attributes are available (208). The system may access the personal device 114 and search the personal device 114 for one or more other attributes of the new contact. If the system determines that there is a contact on the personal device 114 having the same contact attribute as the new contact attribute, the system may obtain the one or more other attributes from the contact attributes of the contact on the personal device 114. For example, if the new contact attribute is a name, the system may access a contact manager on the personal device 114 and locate a contact that has the same name. Once located, the system may obtain any other contact attributes associated with the located contact.

In some implementations, the system may access an external database and search the external database for one or more other attributes of the new contact. The external database may be an email server 108 that contains a contact list or a resource, such as a social networking website that contains contact information. A resource may be a website, such as a social networking site, a webpage, or an electronically stored document accessible over the network 106. If the system determines that there is a contact having the same contact attribute as the new contact attribute, the system may obtain the one or more other attributes from the contact attributes of the contact in the external database or on the resource. If there are no other contact attributes available, the system does not generate a new contact and waits to obtain a new contact attribute.

In some implementations, the system may request, through the user interface 128, the one or more other attributes from a user or an occupant of the vehicle 102. The user interface 128 may display one or more text fields that correspond to the one or more other contact attributes. The system may receive user input in the one or more text fields and associate the user input to one of the other contact attributes.

The system may obtain the one or more other attributes of the new contact that are available (210). The system generates the new contact using the new contact attribute and the one or more other contact attributes (212). The system associates the new contact attribute and each of the one or more other contact attributes with an identifier to generate the new contact. The system stores the new contact in the contact list (214). The contact list may be stored, for example, in the internal database 130.

Figure 3:
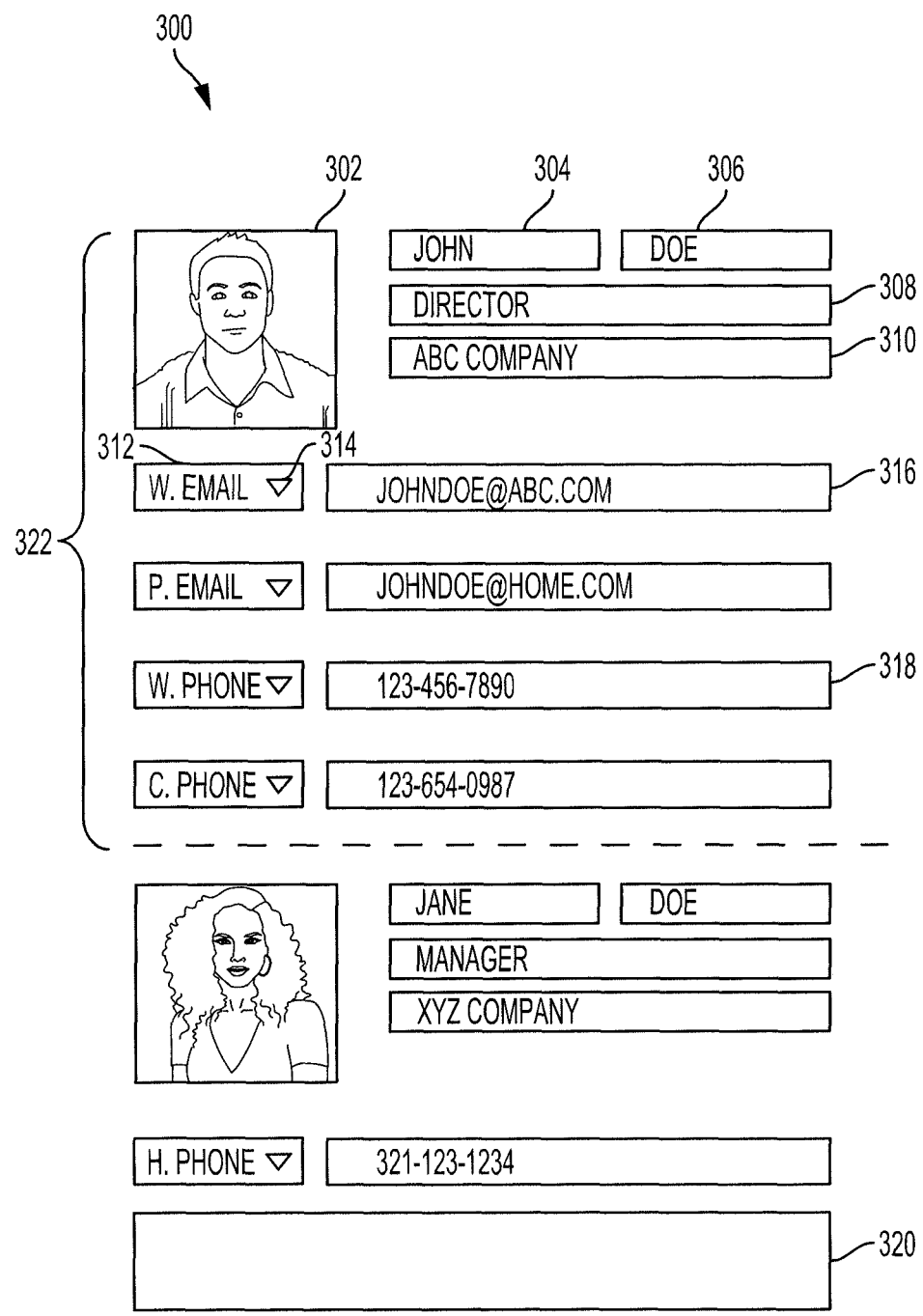
FIG. 3 is an illustration of an example contact list displayed on a user interface according to an aspect of the invention.

FIG. 3 is an illustration of an example graphical user interface (GUI) 300 that displays a contact list. One or more computers or one or more data processing apparatuses, for example, the ECU 112 of the information access and response system 100 of FIG. 1, appropriately programmed, may display the GUI on the user interface 128.

The GUI 300 displays one or more contact cards 322 in a contact list. The one or more contact cards 322 may be moved, managed, edited, added or removed from the contact list through user input on the user interface 128 or by synching with a personal device, e.g., personal device 114, connected to the vehicle 102. One or more contact attributes of the one or more contacts cards 322 may be deleted, moved, added, or edited.

The one or more contact cards 322 include one or more text fields that correspond to the one or more contact attributes. Each of the one or more text fields may accept user input to modify a corresponding contact attribute when the text field is selected. Each of the one or more text fields includes and displays a corresponding contact attribute. For example, a first name "John" is displayed in text field 304 and a last name "Doe" is displayed in text field 306. The one or more text fields may correspond to another text field selected by a user. Text field 312, for example, may include a type of contact address, such as a work email, a personal email, a work phone, a cell phone or a home phone. A user interface element, e.g., the user interface element 314, may toggle or may open a drop down list for the text field 312 of the different types of contact addresses. Text field 316 may correspond to the text field 312. Since the text field 312 indicates a work email address, the text field 316 includes and displays a work email address "JOHNDOE@ABC.com." Text field 318 may correspond to a work phone number, such as "123-456-7890." The one or more text fields may include a text field 308 for a work title and a text field 310 for a company name. The one or more contact cards 322 may include a profile icon 302. In some implementations, a contact card may include a text field 320 that allows user input for general information.

Figure 4:
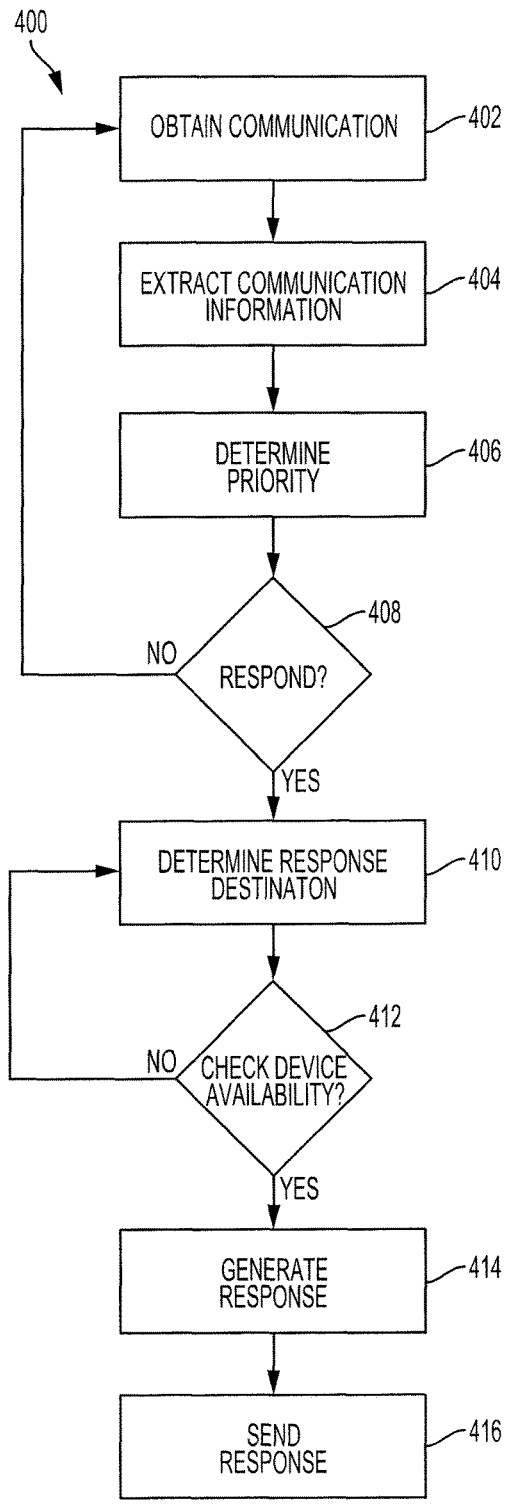
FIG. 4 is a flow diagram of an example process for sending a response to a received communication according to an aspect of the invention.

FIG. 4 is a flow diagram of an example process for sending a response to a received communication. One or more computers or one or more data processing apparatuses, for example, the ECU 112 of the information access and response system 100 of FIG. 1, appropriately programmed may perform the process 400.

The system may obtain received communication from a personal device 114 connected to the vehicle 102 (402). The received communication may be an email, a phone call, a SMS message, an instant message, a calendar invitation or the like. The system may connect to the personal device, for example, by connecting to the personal device 114 through a wireless network. The system may provide credentials, such as user login/password or token, to the personal device 114 to access the personal device. Other credentials may be used to access a contact manager, a calendar, an email service, an application or any other device or mechanism that receives communication. The system obtains the received communication from the personal device 114 to generate and send a response.

The system extracts communication information from the received communication (404). The system may parse the received communication for communication information based on the context of the received communication. The communication information includes one or more contact attributes, and may include one or more destination and/or meeting locations, date/time information including an expected arrival time or meeting time, invitees, attendees, senders, and/or recipients. The system may match formats and/or patterns associated with various types of communication information with text in the received communication to identify the communication information. For example, the system may parse the received communication for a MM/DD/YYYY format that identifies a date and/or a HH:MM:SS format to identify a time. Locations may, for example, be recognized by accessing a search engine and/or an external database and matching keywords in the received communication to places and/or landmarks identified by the search engine and/or the external database. The system may parse the received communication based on the context of the email, e.g., the system may identify an email address as the string before and after an "@" symbol. The system may identify the communication information based on the structure of the received communication, e.g., using the email TO/FROM address line or using embedded tags within the email. The system may read aloud a portion of the received communication that includes the extracted information.

The system may determine the priority of the received communication based on the extracted communication information (406). In particular, the priority may be based on the destination, one or more response recipients, date/time information including an expected arrival time or meeting time, vehicle information, and/or navigational map information. Determining the priority of the received communication is further described below in reference to FIG. 5.

The system determines whether to send a response (408). The system may determine whether to send the response based on the priority of the received communication. If the system determines not to send a response, the system remains idle as the system waits to obtain another communication. Otherwise, if the system determines that a response is needed, the system determines one or more response destinations. A response destination is a phone number, an email address, an instant messaging identifier or handle, e.g., a user id, or another identifier associated with a communication device of a contact that is able to receive responses.

In some implementations, the system may prompt a driver or occupant that a communication was received and request user input as to whether a response should be sent. The prompt may include information describing the priority of the received communication and extracted information, such as the destination location and/or contacts in the received communication. The system determines whether to send the response based on the user input. In some implementations, the system determines whether to send a response based on previous behavior. The system may store information with respect to previous replies and based on the stored history determine whether to send the response. The stored information may include associations between contacts included in the received communication and contact attributes associated with the contacts, which may be used to determine one or more response destinations.

The system may determine one or more response destinations based on at least one of user input, user configuration settings, or default responses destinations or configurations (410). Determining the one or more response destinations includes identifying one or more contacts on the contact list to receive the response and determining a form of communication in which to send the response.

Particular structures, e.g., the "@" symbol and/or formats, such as a string of 10 numbers that may or may not include a "-", "(" or ")" symbol may indicate a contact attribute. The system may use the particular structures and/or formats to determine one or more contact attributes from the extracted communication information. By identifying the one or more contact attributes in the received communication, the system may identify one or more contacts in the contact list that are associated with the one or more contact attributes as potential recipients of the response. The system may compare the extracted contact attributes to the contact attributes of the contacts in the contact list to identify the potential recipients.

The system may have one or more default response destinations or configurations. That is, the system may send the response to all contacts that received the communication or are included in the received communication using a default form of communication, e.g., SMS message, instant message or email. In some implementations, the system may limit the number of responses to a threshold number of recipients. The system may respond using the same form of communication used in receiving the response. For example, if an email was received, the default method to reply may be to use email. In some implementations, the form of communication used may be different for each potential recipient.

In some implementations, the system may determine the response destination using user input or user configuration settings. The system may receive user input that configures user settings, such as a do not send list. The do not send list may indicate contacts which may not receive a response. For example, John Doe may add Jane to the do not send list, so when a received communication includes Jane as a potential recipient of a response, the system removes Jane from the recipient list of a potential response. In some implementations, the system may add a contact as a recipient to the response through the user interface 128.

One or more of the user configuration settings may indicate a particular form of communication, e.g., email, SMS messaging or instant messaging, to use that is given priority over another form of communication when sending the response. For example, a user may set that if a phone number is available an SMS message is sent instead of an email. In some implementations, the system may request user input to determine the form of communication to use to send the response. The request may be a voice request and/or a prompt on the user interface 128.

In some implementations, the system may determine the response destination based on an urgency or a priority of the received communication. For example, if a received communication is urgent, the system may use SMS messaging for the response. Determination of the priority of the received communication is further described below in reference to FIG. 5.

The system may check the availability of a response destination (412). The system may determine if the response destination is available by checking one or more of the contact attributes of the contact. A response destination is available if the recipient of the response is found in the contact list and a contact attribute associated with the determined form of communication is available. For example, if Jane is a recipient and the user settings indicate to send the response as an SMS message, the system searches for Jane's contact information in the contact list and determines if there is a contact attribute associated with a device that receives SMS messaging. The system may search one or more fields of a contact card that includes the contact attributes to determine any devices that are able to receive the determined form of communication. In some implementations, the system may learn which response destination is available for use with the determined form of communication using a stored history of messages previously sent to the recipient. The system may store an indication with the contact attribute that indicates that the response destination is a valid email address, a valid SMS phone number, or a valid instant messaging address. In subsequent responses, the system may use the indication to determine that the response destination is available. In some implementations, the system may determine if a response destination is a home or mobile phone number that is capable of receiving SMS messaging using one or more external databases 104, such as a phone number lookup service. The system may re-determine the form of communication if the determined form of communication is unavailable.

The system generates a response to send to one or more communication devices of the recipients using the determined form of communication (414). The response may include an estimated arrival time, a current location of the vehicle, and/or a time/distance until arrival. A portion of the response may be pre-formed. That is, the system may use a standard response and automatically insert one or more variables, such as the estimated arrival time, the current location and/or the time/distance until arrival into a pre-formed or template response. For example, the template response may state "I should be arriving in _____," and the system may insert a time until arrive, e.g., 5 minutes, into the template so that the response reads, "I should be arriving in 5 minutes." In some implementations, the system may use the user interface 128 to generate a response. The system may, for example, receive a user selection of one or more template responses from the user interface 128 to send to the one or more communication devices of the recipients, e.g., personal device 110, and modify the one or more template responses to include the one or more variables that were calculated. In another example, the system may generate the response by converting speech to text.

The system may use a previous response to generate the response. For example, if the user previously selected a template response to respond to a previously received communication, the system may select the same template response to respond to a current received communication.

The system may also include additional information in the generated response. The generated response may include a Uniform Resource Locator (URL). The URL may link to map information that includes a current location of the vehicle 102. The map information may be provided by a third-party service provider.

The system sends the response to the response destination (416). The system may use the communication device that is coupled to the vehicle 102 and that received the communication, e.g., personal device 114, to send the response.

Figure 5:
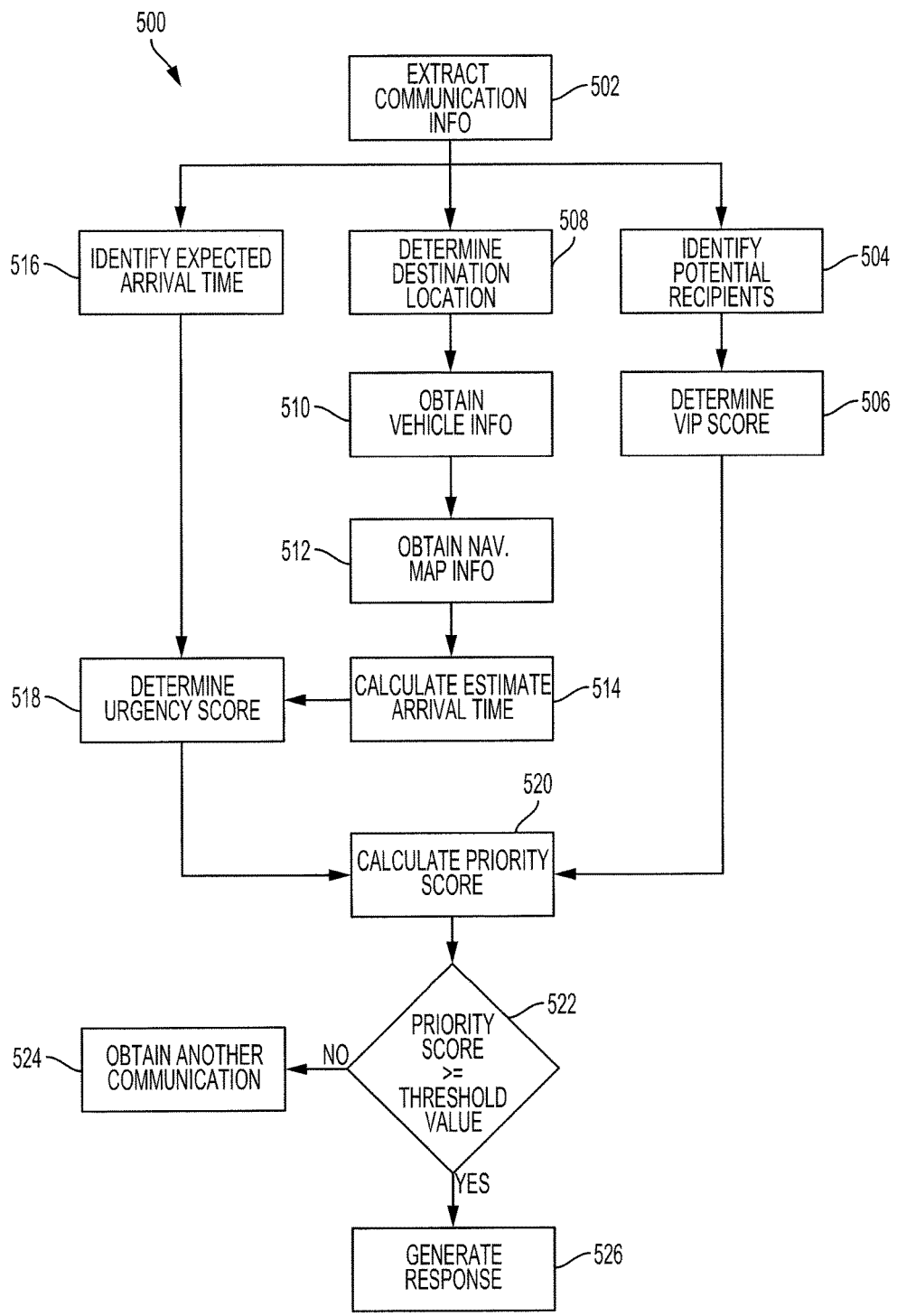
FIG. 5 is a flow diagram of an example process for determining a priority of a received communication according to an aspect of the invention.

FIG. 5 is a flow diagram of an example process for determining a priority of a received communication. One or more computers or one or more data processing apparatuses, for example, the ECU 112 of the information access and response system 100 of FIG. 1, appropriately programmed may perform the process 500.

As described above, the system extracts communication information from the received communication (502). From the extracted communication information, the system may determine the priority of the one or more responses to the one or more recipients. A priority may be represented by a priority score. The overall priority may be based on the importance that a recipient receives a response and the urgency of the response. The priority score may be a function of a very important person (VIP) score that indicates the importance of the identified recipient and an urgency score that indicates the need for an immediate response. Each score may, for example, be of a value between 0 and 100. A value of 0 may indicate that a recipient is not important or a response is not urgent. A value of 100 may indicate that a recipient is very important or a response is urgent. Thus, a priority score of 0 indicates the response is of low priority and a priority score of 100 indicates the response is of a high priority.

The system may identify one or more potential recipients of a response based on the extracted information (504). The system may identify the one or more potential recipients by comparing the extracted information to contact attributes for each contact in the contact list. If the extracted information matches a contact attribute of a particular contact, the system may identify the particular contact as a potential recipient. If the extracted information does not match a contact attribute of a contact in the contact list, the system may attempt to create a new contact, as described in FIG. 2. The system may identify the new contact as a potential recipient if there is sufficient information to identify the new contact. Each contact may be associated with a VIP score. The VIP score may be included as a contact attribute within the contact information, and may be user configurable.

The system may determine the VIP score for each potential recipient (506). The VIP score may be based on information within the contact information of the contact. In some implementations, the system determines a VIP score for a contact based on a frequency of communication or a degree of separation between the contact and an occupant of the vehicle 102. The degree of separation between the contact and an occupant of the vehicle may be determined using one or more external databases 104, such as a social media website.

The system may not generate a response for any of the one or more potential recipients that are on a do not contact list, and so, the system may not determine a priority for responses to them. In some implementations, the system does calculate a priority for responses to the one or more potential recipients on a do not contact list but sets the VIP score to indicate that the identified recipient is of no importance.

The system determines one or more destination locations from the extracted information (508). The system may identify a place of interest, e.g., a restaurant, a building, a tourist site, a transit hub, or any other place, and search the one or more external databases 104 to determine a destination location. For example, the system may identify that a meeting is being held at ABC Company so the system searches an online directory to determine that ABC Company is at 3425 Winchester Ln., Irvine, Calif. 94565. A destination location may include a physical address or map coordinates. The system may recognize one or more keywords or abbreviations that indicate a location or address, e.g., drive, circle, suite, bldg., unit or Blvd., to determine a destination location using text surrounding the one or more keywords or abbreviations. In some implementations, the system uses pattern recognition to identify a destination location, e.g., a pattern of five digits may indicate a zip code.

The system may obtain vehicle information from one or more sensors 126, e.g., a vehicle speed sensor or an internal clock, or from the navigation unit 122 using, for example, a GPS device (510). The system may obtain navigational map information from the one or more external databases 104 (512).

The system may determine an estimated arrival time based on the vehicle information, navigational map information, and destination location (514). The system may determine a distance remaining between the destination location and the current location of the vehicle 102 based on a route. The route may be determined or selected by a user through the user interface 128. The determined route may be the shortest route between the current location of the vehicle and the destination location. The shortest route may be based on an actual distance between the current location and the destination location or may be based on a calculated travel time between the current location and the destination location. Travel time may be a function of the distance and the speed of traffic along the route. The speed of traffic along the route may be an average speed, one or more posted speeds, or a combination of both. For example, the system may use the average speed of traffic for a part of the route with heavy traffic congestion and use the posted speed limit for a part of the route with no traffic to calculate the estimated arrival time to the destination.

In some implementations, the system obtains the estimated arrival time from one or more external databases 104. The system may send a request that includes the current location of the vehicle 102 and the destination location to the one or more external databases 104 and obtains the estimated arrival time. In some implementations, the system may adjust the estimated arrival time using traffic condition information that is updated periodically or in real-time.

The system may identify an expected arrival time from the extracted communication information by using pattern recognition techniques to identify strings that match a date and/or time format (516). The system may use one or more keywords or phrases, such as "meet at," to identify the expected arrival time in the received communication.

The system may determine the urgency score based on a comparison between the estimated arrival time and the expected arrival time (518). The urgency score may correspond to how late the vehicle 102 may be for a commitment. A larger difference between the estimated arrival time and the expected arrival time may result in a higher urgency score. When calculating the urgency score, the system may add a safety margin to the expected arrival time so that the vehicle 102 is expected to arrive earlier than the expected arrive time.

A higher urgency score indicates a greater urgency to respond to the received communication. A response is more urgent and has a greater urgency score if the system determines that the vehicle 102 will arrive at the destination location after the expected arrival time, i.e., the estimated arrival time is greater than the expected arrival time, than when the vehicle arrives on-time. A difference between the estimated arrival time and the expected arrival time may be calculated to determine the amount of time the vehicle 102 is scheduled to arrive after the expected arrival time. For example, the urgency score may be a value of 90 if the vehicle is estimated to arrive 20 minutes late and a value of 40 if the vehicle is estimated to arrive 1 minute late. A response may be urgent if the estimated arrival time is before the expected arrival time but within a safety margin of the expected arrival time. For example, if the meeting is at 2:00 p.m. and the vehicle 102 is estimated to arrive at 1:55 p.m. but the safety margin is 10 minutes, the system may assign an urgency score of 20 since the estimated time arrival is within the safety margin. The safety margin and the sensitivity of the urgency score may be user-configurable through a user interface 128.

The system may calculate a priority score based on the VIP score and the urgency score (520). The priority score may be a function of the VIP score and the urgency score. The function may be weighted, and the weight may be user configurable. For example, the VIP score and/or the urgency score may be multiplied by a weighting factor to calculate the priority score. The system may compare the priority score to a threshold value (522). If the priority score is less than a threshold value, the system may not generate a response for the identified recipient and may proceed with obtaining another communication and/or calculating a priority score for another recipient (524). If the priority score is greater than or equal to a threshold value, the system may generate a response for the identified recipient (526). The threshold value may be user configurable.

In some implementations, if the vehicle information indicates that the vehicle 102 has not arrived at the destination location and the expected arrival time is past, the system automatically generates and sends out a response without calculating the priority score. The vehicle may send out the automatically generated response a threshold time after the expected arrival time. The threshold time may be user configurable.

In some implementations, if there is no destination location but the vehicle information indicates that the current time is a threshold amount from the expected arrival time, the system generates and sends out a response.

Although the vehicle described herein is operated by a driver, the systems and methods described herein may be equally applicable to semi-autonomous and autonomous vehicles. The semi-autonomous vehicles and/or the autonomous vehicles may operate using one or more sensors 126 and/or the navigation unit 122.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An information access and response system for a vehicle, comprising:
   a network access device configured to receive a communication from a communication device via a first form of communication;
   a memory for storing a plurality of contacts in a contact list;
   an electronic control unit (ECU) coupled to the network access device and the memory, the electronic control unit configured to:
   extract a contact attribute from the received communication;
   determine that the contact attribute matches a contact attribute of a contact in the contact list;
   determine that the contact is to receive a reply to the received communication using a second form of communication;
   determine that the contact has a second contact attribute that identifies a response destination where the reply is to be sent and that is associated with the second form of communication;
   determine that the response destination is available to receive the reply via the second form of communication before sending the reply;
   generate the reply to the received communication; and
   send the reply to the response destination via the second form of communication.

2. The system of claim 1, wherein the received communication is a calendar, email or invitation and the contact attribute from the received communication is a first name, a last name, a phone number or an email address.

3. The system of claim 1, wherein to generate the reply the ECU is configured to:
receive user input for the reply from a user interface, wherein the user input is text input into the user interface; and
insert the user input into the reply.

4. The system of claim 1, further comprising:
a navigation unit configured to obtain vehicle information including a current location of the vehicle, a vehicle speed, and a destination location,
wherein the ECU is further configured to:
extract from the received communication an expected arrival time, and
determine an estimated arrival time based on the vehicle information,
wherein the ECU determines that the contact is to receive the reply to the received communication when the estimated arrival time is later than the expected arrival time.

5. The system of claim 4, wherein the received communication is a calendar appointment or meeting notice and the expected arrival time is an appointment or meeting time.

6. The system of claim 4, wherein to extract the expected arrival time and the contact attribute the ECU is configured to:
parse the received communication for the expected arrival time and the contact attribute; and
identify the expected arrival time and the contact attribute by matching one or more formats or patterns that indicate a date, a time, a phone number, a first name, a last name, or an email address.

7. The system of claim 6, wherein the one or more formats or patterns are user configurable and set by user input.

8. The system of claim 4, wherein the reply includes a difference between the estimated arrival time and the expected arrival time.

9. The system of claim 1, further comprising:
an external database that is configured to provide a lookup service that identifies one or more response destinations that are available or unavailable;
wherein the electronic control unit is configured to determine that the response destination is available to receive the reply via the second form of communication using the lookup service.

10. A vehicle comprising:
a network access device configured to receive a communication from a personal device via a first form of communication;
a vehicle speed sensor configured to detect vehicle speed data;
a memory configured to store a plurality of contacts in a contact list;
a navigation unit configured to obtain a current location of the vehicle; and
an electronic control unit (ECU) connected to the navigation unit and configured to:
extract a contract attribute, an expected arrival time and a destination location from the received communication,
determine that the contact attribute matches a contact attribute of a contact in the contact list,
determine an estimated arrival time based on the vehicle speed data, the current location of the vehicle and the destination location,
determine that the estimated arrival time is later than the expected arrival time,
determine that the contact is to receive a reply to the received communication,
determine that the contact has a second contact attribute that identifies a response destination where the reply is to be sent and that is associated with a second form of communication,
determine that the response destination is available to receive the reply via the second form of communication,
generate the reply to the received communication, and
automatically communicate the reply to the response destination using the second form of communication.

11. The vehicle of claim 10, wherein the received communication is a calendar invitation, an email, an SMS message, or an instant message.

12. The vehicle of claim 10, wherein the ECU is further configured to:
receive user input for the reply from a user interface, the user input being text input into the user interface, and
insert the user input into the reply.

13. The vehicle of claim 10, wherein the reply includes a difference between the estimated arrival time and the expected arrival time.

14. The vehicle of claim 10, wherein the ECU is further configured to automatically generate the reply based on a template response and at least one of the estimated arrival time, the current location of the vehicle, or a time/distance until arrival.

15. A method for automatically responding to a communication, the method comprising:
obtaining, by a processor and from a memory, a contact list that includes a contact;
obtaining, by the processor, a communication from a personal device via a first form of communication;
extracting, by the processor and from the communication, an expected arrival time and contact information;
determining, by the processor, that the contact information matches a contact attribute of the contact;
determining, by the processor, that the contact is to receive a reply to the received communication;
determining, by the processor, that the contact has a second contact attribute that identifies a response destination where the reply is to be sent and that is associated with a second form of communication;
determining, by the processor, that the response destination is available to receive the reply via the second form of communication;
generating, by the processor, the reply to the received communication; and
sending the reply to the response destination using the second form of communication.

16. The method of claim 15, wherein the reply includes at least one of an estimated time or distance to arrival or a Uniform Resource Locator (URL) that links to map information with a current location of the vehicle.

17. The method of claim 15, wherein the communication is a calendar appointment or meeting notice and the expected arrival time is an appointment or meeting time.

18. The method of claim 15, further comprising calculating a difference between an estimated arrival time and the expected arrival time, and wherein the reply includes the difference between the estimated arrival time and the expected arrival time.

* * * * *